United States Patent
Hummel

(10) Patent No.: US 10,591,024 B2
(45) Date of Patent: Mar. 17, 2020

(54) DUAL CLUTCH TRANSMISSION FOR A MOTOR VEHICLE

(71) Applicant: AUDI AG, Ingolstadt (DE)

(72) Inventor: Steffen Hummel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 463 days.

(21) Appl. No.: 15/551,756

(22) PCT Filed: Jan. 20, 2016

(86) PCT No.: PCT/EP2016/051110
§ 371 (c)(1),
(2) Date: Aug. 17, 2017

(87) PCT Pub. No.: WO2016/131594
PCT Pub. Date: Aug. 25, 2016

(65) Prior Publication Data
US 2018/0023670 A1 Jan. 25, 2018

(30) Foreign Application Priority Data
Feb. 19, 2015 (DE) .......... 10 2015 002 134

(51) Int. Cl.
*F16H 3/00* (2006.01)
*F16H 3/08* (2006.01)
*F16H 3/089* (2006.01)

(52) U.S. Cl.
CPC ............ *F16H 3/006* (2013.01); *F16H 3/089* (2013.01); *F16H 2003/0803* (2013.01);
(Continued)

(58) Field of Classification Search
CPC . F16H 3/093; F16H 3/006; F16H 3/10; F16H 37/043; F16H 2003/007
(Continued)

(56) References Cited

U.S. PATENT DOCUMENTS 5,392,665 A * 2/1995 Muller .................. F16H 3/093
74/330
7,472,617 B2 * 1/2009 Nicklass ................ F16H 3/006
74/331
(Continued)

FOREIGN PATENT DOCUMENTS

DE 10 2011 089 167 A1 6/2013
DE 10 2012 013 248 A1 1/2014
DE 10 2012 217 027 A1 4/2014

OTHER PUBLICATIONS

Office Action dated Aug. 20, 2019, in corresponding Chinese Application No. 201680009865.1 including partial machine-generated English language translation; 6 pages.
(Continued)

*Primary Examiner* — Ha Dinh Ho
(74) *Attorney, Agent, or Firm* — Maier & Maier, PLLC

(57) ABSTRACT

A dual-clutch transmission for a motor vehicle, with gear wheel sets engageable via shift elements, with the gear wheel sets forming particularly precisely eight wheel planes, each of which is allocated to a first sub-transmission and a second sub-transmission, of which each sub-transmission has an input shaft and both sub-transmissions have a common output shaft. The input shafts, which are coaxial with respect to one another, can each be activated in an alternating manner via a power-shift clutch, and the even forward gears are allocated to the first sub-transmission and the odd forward gears are allocated to the second sub-transmission, which can be engaged upon a gear change by way of the shift elements.

17 Claims, 2 Drawing Sheets

(52) U.S. Cl.
CPC ............ *F16H 2003/0818* (2013.01); *F16H 2003/0822* (2013.01); *F16H 2003/0826* (2013.01); *F16H 2200/0078* (2013.01)

(58) Field of Classification Search
USPC .................................. 74/330, 331, 333, 340
See application file for complete search history.

(56) References Cited

U.S. PATENT DOCUMENTS

| | | | | |
|---|---|---|---|---|
| 8,051,732 B2* | 11/2011 | Gitt | ................ | F16H 3/006 74/330 |
| 8,627,736 B2* | 1/2014 | Maerkl | ................ | F16H 3/093 74/325 |
| 9,114,699 B2* | 8/2015 | Takei | ................ | B60K 6/365 |
| 2011/0030488 A1* | 2/2011 | Gumpoltsberger | ..... | F16H 3/006 74/331 |
| 2014/0013881 A1* | 1/2014 | Luebke | ................ | F16H 3/006 74/331 |

OTHER PUBLICATIONS

Notification of Transmittal of Copies of Translation of the International Preliminary Report on Patentability dated Aug. 24, 2017, in connection with corresponding international application No. PCT/EP2016/051110 (20 pages).

International Search Report and Written Opinion dated May 4, 2016 of corresponding International application No. PCT/EP2016/051110; 21 pgs.

International Preliminary Report on Patentability dated Jun. 8, 2017 of corresponding International application No. PCT/EP2016/051110; 21 pgs.

* cited by examiner

| G | K1 | K2 | RE-1 | RE-2 | RE-3 | RE-4 | RE-5 | RE-6 | RE-7 | RE-8 | SE-A | SE-B | SE-C | SE-D | SE-E | SE-F |
|---|----|----|------|------|------|------|------|------|------|------|------|------|------|------|------|------|
| 1 | X |   |   |   |   |   |   |   |   |   |   |   |   |   |   |   |
| 1 |   | X | X | X |   |   | X |   | X | X | re | ii |   | re |   |   |
| 2 |   | X | X | X | X |   | X |   |   |   |   |   | ii |   |   |   |
| 3 | X |   |   |   | X |   |   |   |   |   |   | ii | ii |   |   |   |
| 3 |   | X |   |   | X |   | X |   |   |   | ii |   |   |   |   |   |
| 4 |   | X | X |   |   |   |   |   |   |   |   |   | re | re |   |   |
| 5 | X | X | X |   |   |   | X |   |   |   | re |   |   |   |   | re |
| 6 |   | X |   |   |   |   |   |   | X | X |   |   | ii |   | ii |   |
| 7 | X | X |   | X |   |   |   |   | X |   | ii |   |   |   |   | ii |
| 8 | X | X | X | X |   |   |   | X | X | X | re | re | re |   |   | ii |
| 9 | X | X |   |   |   |   |   | X |   |   | ii |   |   |   | ii |   |
| 10 | X | X |   |   |   | X |   |   |   |   |   | re | ii | ii |   |   |
| 11 | X | X |   |   |   | X |   |   |   |   | ii | re | ii |   |   |   |
| 12 |   | X |   |   |   |   |   |   |   |   |   |   | re | ii |   |   |

Fig. 2

DUAL CLUTCH TRANSMISSION FOR A MOTOR VEHICLE

FIELD

The present invention relates to a dual-clutch transmission for a motor vehicle.

BACKGROUND

In addition to a good level of efficiency, this type of dual-clutch transmission has the advantage, among other things, that it can be engaged, particularly in an automated manner, without interrupting the tractive force, whereby, in the non-activated sub-transmission, a gear can already be preselected, which is then activated by switching the power-shift clutches. In doing so, the odd gears (1, 3, 5, etc.) in one sub-transmission and the even gears (2, 4, 6, etc.) in the other sub-transmission are positioned by means of corresponding gear wheel sets, which are drivingly connected to the respective input shaft or the output shaft, for example, via synchronous clutches.

The axial length of the dual-clutch transmission depends on the number of gear wheel sets or wheel planes, which are arranged in the axial direction behind one another in the dual-clutch transmission. Each of the wheel planes is constructed of at least two fixed and/or detached gear wheels. Shift elements, upon the activation of which forward and reverse gears can be engaged, are arranged between the wheel planes.

A generic dual-clutch transmission has gear wheel sets, which form, in particular, precisely eight wheel planes, which can be engaged by way of shift elements. The wheel planes are allocated to a first sub-transmission and a second sub-transmission, respectively. Each of the sub-transmissions has an input shaft as well as a common output shaft. The input shafts, which are coaxial with respect to one another, can be activated in an alternating manner by way of a power-shift clutch, wherein the even forward gears are allocated to the first sub-transmission and the uneven forward gears are allocated to the second sub-transmission, which can be engaged during a gear change by way of the shift element. Each of the wheel planes here provides a direct gear in which precisely one wheel plane is engaged in the torque flow extending through the activated sub-transmission.

SUMMARY OF THE DISCLOSURE

The object of the invention is to provide a dual-clutch transmission, which has a greater degree of freedom in its functionality (shifting strategy) and in the design of the gear steps, with a structurally beneficial design.

According to the present invention, the wheel planes provide, in addition to the direct gears, at least one torsion gear, or particularly up to four torsion gears, in which, by means of the shift elements, precisely three wheel planes combined in series are engaged in the torque flow. The wheel planes thus form both direct forward gears and torsion forward gears in a dual function. Contrary to the direct forward gears, the particular torsion forward gear does not have its own allocated wheel plane. In this manner, the transmission structural length is reduced in the axial direction despite a plurality of engageable forward gears, namely in comparison to a dual-clutch transmission in which the forward gears can only be engaged as direct gears.

Preferably, the transmission structure can be designed such that a total of four torsion forward gears can be represented with a total of eight wheel planes. With the provision of the torsion forward gears, preferably all of the wheel planes of the transmission can be engaged at least once in the torque flow as a torsion wheel plane.

In order to engage the forward gears, precisely five shift elements engageable on both sides in the axial direction can be provided in a compact transmission design, that is SE-A, SE-B, SE-D, SE-C, and SE-F. In addition, at least one shift element SE-G engageable on one side can be provided. Precisely four shift elements of the five shift elements engageable on both sides, namely SE-A, SE-B, SE-D, and SE-C, can be arranged coaxially with respect to the input axis of the input shafts. In this case, precisely one shift element SE-F engageable on both sides can be arranged on the output shaft. The transmission structure here can be designed such that preferably precisely two of the shift elements, SE-A to SE-F, can be actuated in order to set the gear of the forward gears.

In a technical implementation, each input shaft of the dual-clutch transmission may have precisely one shift element engageable on both sides (for example, a dual-synchronous clutch). The first input shaft is coupled to the first to fourth wheel planes of the first sub-transmission or decoupled therefrom by means of the first shift element SE-C. The second input shaft, on the other hand, is coupled to the fifth to eighth wheel planes of the second sub-transmission or decoupled therefrom by means of the second shift element SE-A.

In this case, the two coaxial input shafts no longer support fixed gear wheels, but rather only the two first and second shift elements. In comparison to the previous prior art, the input shafts can thereby be designed with essentially less material. In addition, wheel planes in the respectively activated sub-transmission can be at least partially decoupled, that is, shut down from the torque flow by means of the first and second shift elements, SE-C and SE-A, whereby the moment of inertia of the activated sub-transmission can be reduced. During a gear change, this leads to a reduction in shifting times and/or to a reduction in the energy input required for the gear change.

The first shift element SE-C arranged in the first sub-transmission can either be coupled to a drive-side detached gear wheel, of a first wheel plane, mounted on the first input shaft, or to a hollow shaft coaxially mounted on the first input shaft. The drive-side hollow shaft rotationally mounted on the first input shaft can support at least one, or preferably two, drive-side fixed gear wheels, which are allocated to a second wheel plane and a third wheel plane, respectively.

In one technical implementation, a drive-side gear wheel of a fourth wheel plane can additionally be detachably mounted on the drive-side hollow shaft of the first sub-transmission. The drive-side gear wheel of the fourth wheel plane can be linked to the hollow shaft by way of a third shift element SE-D.

In an enhancement of the invention, a fifth wheel plane, directly adjacent to the first sub-transmission in the axial direction, is allocated to the second sub-transmission. The fifth wheel plane may have a drive-side gear wheel, which is mounted rotatably on the second input shaft and is preferably attachable to the drive-side hollow shaft of the first sub-transmission by means of the above third shift element SE-D. In this manner, the fifth wheel plane can either be engaged on the first or on the second sub-transmission.

As previously mentioned, the second input shaft can likewise support precisely one second shift element SE-A, which is formed, for example, as a dual synchronous clutch. In this case, a detached gear wheel of an eighth wheel plane, which is mounted on the drive side on the second input shaft, and a hollow shaft, which is coaxially mounted on the drive side on the second input shaft, can be arranged in the axial direction on both sides of the second shift element in the second sub-transmission. The drive-side hollow shaft and the above detached gear wheel of the eighth wheel plane may be linked (by way of the second shift element SE-A), in an alternating manner, to the second input shaft. The drive-side hollow shaft of the second sub-transmission can preferably support a drive-side fixed gearwheel of the seventh wheel plane as well as a drive-side detached gearwheel of the sixth wheel plane. For engaging the drive-side detached gear wheel of the sixth wheel plane, the drive-side hollow shaft may have a fourth shift element SE-B, with which the detachably mounted drive-side gear wheel of the sixth wheel plane can be linked to the hollow shaft in the second sub-transmission. In a preferred embodiment, the drive-side, detachably mounted gear wheel of the fifth wheel plane, which is engageable on both sub-transmissions, can additionally be linked by means of the above fourth shift element SE-B to the drive-side hollow shaft of the second sub-transmission.

In one technical implementation, the output shaft is arranged parallel to the axis with respect to the input shaft. Preferably, the drive-side gear wheels of the first and second wheel planes may be arranged on a hollow shaft, in a torsionally resistant manner, in the first sub-transmission, with the hollow shaft being rotatably mounted coaxially on the output shaft. The output shaft can additionally have a fifth shift element SE-F, by means of which the hollow shaft or a drive-side gear wheel of the third wheel plane can be linked to the output shaft in the first sub-transmission, in an alternating manner.

In a similar manner as in the first sub-transmission, the drive-side gear wheels of the seventh and eighth wheel plane may also be arranged on a drive-side hollow shaft, in a rotationally resistant manner, in the second sub-transmission as well, with the hollow shaft being rotatably mounted coaxially on the output shaft. The hollow shaft rotationally mounted on the output shaft in the second sub-transmission can be linked to the output shaft with the assistance of a sixth, one-sided shift element SE-E.

In one design variant, the drive-side gear wheel of the fifth wheel plane, which is engageable on both sub-transmissions, can be arranged on the output shaft, in a torsionally resistant manner, as a fixed gear wheel. In this case, the fifth wheel plane would continuously rotate also during driving operation and may cause wear on the pivot bearings prematurely. Against this backdrop, the drive-side gear wheel of the fifth wheel plane may also be detachably mounted on the output shaft and can be linked to the output shaft by way of a sixth shift element SE-G.

As previously mentioned, at least one gear wheel set, that is the fifth wheel plane, of the one sub-transmission can be linked to the other sub-transmission by way of a shift element. This means that at least one forward gear can be bypassed, that is shifting from one odd forward gear without delay into the next odd forward gear, for example, with little extra effort or expense as regards gear technology and without having to dispense with the advantage of the acceleration without interruption of tractive force of the motor vehicle. Particularly with powerful engine types of a motor vehicle and with defined driving conditions, this can enable an improved acceleration and possibly an improved level of efficiency during driving operation without shift delays.

Especially preferred, the gear wheel set can form at least the 3rd forward gear of the sub-transmission, which can be drivingly connected, optionally, indirectly or directly, with the input shaft of one or the other sub-transmission A, B. In addition to the regular shift strategy, this results in a variant in which shifting can go from the 1st gear into the 3rd gear and, if necessary, from this gear into 5th gear without interruption of tractive force.

If said gear wheel set is also integrated into the power flow of the 1st forward gear with a corresponding technological transmission design, the sub-transmission here can also be switched, from which an additional degree of freedom in functionality is created.

In a preferred embodiment of the invention, the fixed gear wheel of the gear wheel set, which is engageable on both sub-transmissions, can be arranged on the common output shaft of the output shaft of the manual transmission, while the corresponding, engageable detachable gear wheel can be easily linked to shift element SE-D of sub-transmission A or to shift element SE-B of sub-transmission B, by control technology. The shift elements here may be dual clutches by means of which a gear wheel set of the one sub-transmission or the gear wheel set of the other sub-transmission can be engaged.

In an advantageous enhancement of the invention, with a 12-gear transmission, only eight gear planes can be used through multiple use of the gear wheel sets, whereby the commonly used gear wheel set of the one sub-transmission is arranged directly adjacent to the other sub-transmission. The manual transmission can thus be designed structurally relatively short and with the least possible number of shift elements and gear actuators.

Furthermore, fixed gear wheels of multiple wheel or gear planes of both sub-transmissions can be attached to common hollow shafts in each case, and they can be rotatably mounted on the common output shaft as well as linked to the output shaft by way of the shifting clutches (i.e. shift elements) for this purpose.

Furthermore, additional fixed gear wheels of the gear planes can be arranged on a hollow shaft, which is mounted on the input shaft of the one sub-transmission and which can be linked to said gear wheel set of the other sub-transmission by means of a shifting clutch.

Finally, with the least amount of technical transmission effort or expense that is possible, the twelve forward gears can be engaged by means of five dual clutches and one single clutch, whereby four dual clutches are positioned on the two coaxially arranged input shafts of the sub-transmission, and a dual clutch as well as a single clutch are positioned on the common output shaft.

BRIEF DESCRIPTION OF THE DRAWING

An exemplary embodiment of the invention is explained in more detail in the following using the accompanying drawing. The following is shown:

FIG. 2 shows a shifting matrix of the manual transmission according to FIG. 1;

DETAILED DESCRIPTION OF THE DRAWING

Figure 1:
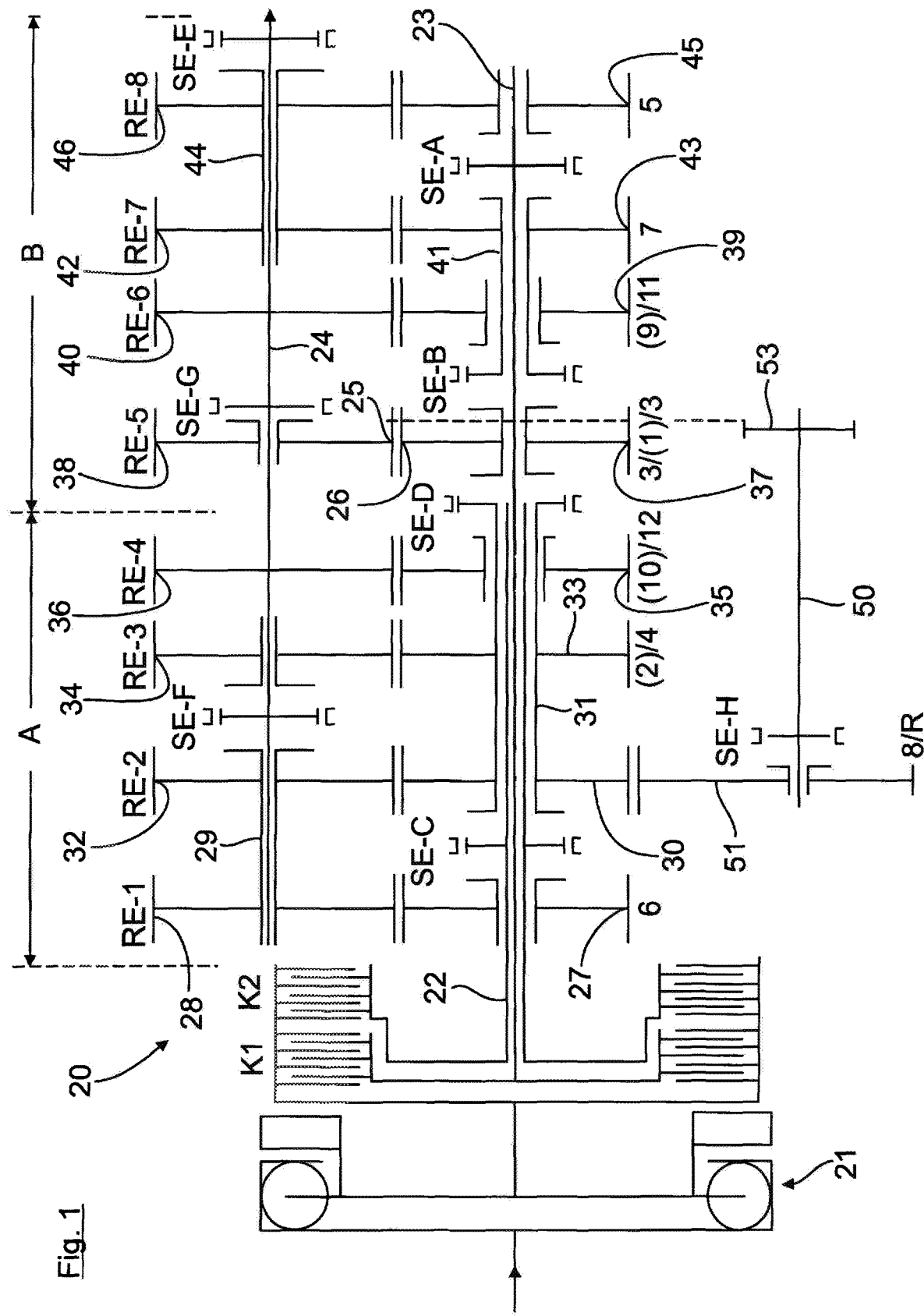
FIG. 1 shows, as a block diagram, a variable-speed manual transmission for motor vehicles with two sub-transmissions, which can be activated via two power-shift clutches, and with 12 shiftable clutches, in which a gear wheel set of the transmission can be used for both sub-transmissions.

FIG. 1 shows a variable-speed manual transmission or a dual-clutch transmission 20 for a motor vehicle, by means of which up to twelve forward gears, 1 to 12, can be engaged in eight wheel planes and/or with eight gear wheel sets, RE-1 to RE-8. Each of the wheel planes, RE-1 to RE-8, is constructed from a drive-side gear wheel coaxial with respect to the input shaft 22, 23 and a drive-side gear wheel coaxial with respect to the output shaft 24.

The manual transmission 20 has, for example, two input shafts 22, 23, which can be drivingly linked to an internal combustion engine (not shown) and a torsional vibration damper 21, in an alternating and coupling manner, via two power-shift clutches K1, K2, with one input shaft 22 being a hollow shaft through which the second input shaft 23 is routed. The pivot bearing and the corresponding transmission housing are not shown.

Gear wheel sets or wheel planes RE-1 to RE-8 are arranged, in a known manner, on the input shafts 22, 23 by engageable detached gear wheels and by fixed gear wheels and arranged on a common output shaft 24, in a manner yet to be described, in which gear wheel sets RE-1 to RE-4 form a first sub-transmission A and gear wheel sets RE-5 to RE-8 form a second sub-transmission B.

Gear wheel set RE-5 of sub-transmission B is arranged on output shaft 24 with a fixed gear wheel 38 and on input shaft 23 with an engageable detached gear wheel 26 axially directly adjacent sub-transmission A such that its detached gear wheel 27 can be linked either to sub-transmission A by way of shifting clutch SE-D or can be linked to sub-transmission B by way of shifting clutch SE-B.

The remaining gear wheel sets are arranged such that, with only eight gear wheel sets, RE-1 to RE-8, the 12 forward gears can be executed, in which:

detached gear wheel 27 of RE-1 is arranged, in a torsionally resistant manner, on input shaft 22 and its fixed gear wheel 28 is arranged on a hollow shaft 29 mounted coaxially with respect to the output shaft 24;

a fixed gear wheel 30 of RE-2 is mounted on the input shaft 22 via a hollow shaft 31, and the corresponding fixed gear wheel 32 is likewise arranged on the hollow shaft 29, in a torsionally resistant manner;

the detached gear wheel 27 in the hollow shaft 31 can be linked, in an alternating manner, to the input shaft 22 by means of a shifting clutch SE-C;

a fixed gear wheel 33 of RE-3 is arranged on the hollow shaft 31, while its detached gear wheel 34 or the hollow shaft 29 can be linked to the output shaft 24, in an alternating manner, by way of a shifting clutch SE-F;

furthermore, a detached gear wheel 35 of gear wheel set RE-4 is mounted on hollow shaft 31, which engages with a fixed gear wheel 36 on the output shaft 24;

the detached gear wheel 37 of gear wheel set RE-5 is mounted on the central input shaft 23 of sub-transmission B, which is engaged with the other fixed wheel gear 38 on the output shaft 24, directly axially adjacent to the detached gear wheel 35 of gear wheel set RE-4;

the two detached gear wheels 35, 37 can be linked to the hollow shaft 31 on the input shaft 22, in an alternating manner, by way of an additional shifting clutch SE-D;

in addition, the detached gear wheel 37 can be linked to a hollow shaft 41 mounted on the input shaft 23 by way of a second shifting clutch SE-B, in which the hollow shaft 41 supports a detached gear wheel 39 of gear wheel set RE-6, which likewise can be linked to the hollow shaft 41 by way of shifting clutch SE-B;

the detached gear wheel 39 of gear wheel set RE-6 engages with a further fixed gear wheel 40 on the output shaft 24;

the hollow shaft 41 furthermore has a fixed gear wheel 43 of gear wheel set RE-7, which engages with a fixed gear wheel 42 on a hollow shaft 44, which is rotatably mounted on the output shaft 24;

the hollow shaft 41 on the input shaft 23 can furthermore be connected to the input shaft 23 via a shifting clutch SE-A, in which the shifting clutch SE-A also links a detached gear wheel 45 of gear wheel set RE-8 to the input shaft 23, in an alternating manner;

the fixed gear wheel 46 of gear wheel set RE-8 is arranged on the hollow shaft 44, similar to fixed gear wheel 42 of RE-7, in which the hollow shaft 44 can be linked to the output shaft 24 by way of a single-shifting clutch SE-E;

Shifting clutches SE-C, SE-F, SE-D, SE-B, and SE-A may be implemented as dual synchronous clutches, which are known and customary with manual transmissions (with a setting of its slider clutches as in the drawing in FIG. 1, left (L) or right (R), and shifting clutch SE-E designed as a single synchronous clutch (shift setting L), which can be engaged, in an electronically controlled manner, by way of corresponding electrically/hydraulically actuated actuators from a neutral setting (as shown).

The clutches K1, K2 may be hydraulically power-shift disk clutches, which link sub-transmission A or B into the drive power flow, when activated in an alternating manner, after a corresponding preselection of gears.

Forward gears 1 to 12 (a potentially required reverse gear is not indicated for the sake of simplicity) may be engaged according to the shifting matrix in FIG. 2, in which the respectively engaged gear (G) 1 to 12 is indicated in the left column of the matrix. The X marks (X) characterize gear wheel sets RE1 to RE8 integrated into the respective power flow and the designation (L) or (R) indicates the shift settings of the respective shifting clutches SE. It should be noted that gears 1 and 3 in column G are indicated in duplicate, because they can be engaged by way of sub-transmission B (clutch K1) or sub-transmission A (clutch K2) as an option.

The regular shifting sequence may be 1-2-3-4-5 ff. accordingly, in which the 1st gear is implemented via clutch K1 (sub-transmission B) and the other gears are implemented via alternating engagement of clutches K2, K1, K2, etc. In the sub-transmission with the disengaged clutch, the next gear can be preselected as is known, whereby engagement can be implemented by switching clutches K1, K2 without interrupting the tractive force.

In the modified shifting sequence, the 2nd gear and optionally also the 4th gear can be bypassed without interrupting the tractive force, in which the flow of force in the 1st gear is controlled with corresponding integration of gear wheel sets RE-1 to RE-8 and setting of the shifting clutches SE (see matrix) via clutch K1 or K2 (sub-transmission A or B). The result of this is that the 3rd gear and optionally the 5th gear are already preselected and can be activated by switching the power-shift clutch without interrupting the tractive force.

In addition to the regular shifting sequence of the dual-clutch transmission 20, the modified shifting sequence 1-3-4-5-6 ff. is thus controllable in the sequence K2, K1, K2, K1, K2 ff. or 1-3-5-6 ff. is controllable in the sequence K1, K2, K1, K2 ff., in which the shifting sequences can be definable and/or manually adjustable depending on operating data and vehicle parameters of the motor vehicle by way of an electronic transmission control.

As emphasized from the shifting matrix in FIG. 2, forward gears 3 to 8 as well as 11 and 12 are designed as direct gears, each of which has precisely one wheel plane engaged in the torque flow. Contrary to this, forward gears 1, 2, and 9, as well as 10 are not implemented as direct gears but rather as torsion gears in which precisely three wheel planes are combined in series and engaged in the torque flow by means of shift elements SE-A to SE-G. For example, in the first forward gear (torsion gear), the eighth, seventh, and fifth wheel plane, RE-8, RE-7, and RE-5, are engaged in the torque flow. In the 2nd forward gear (torsion gear), the first, second, and third wheel plane, RE-1, RE-2, RE-3, are engaged in the torque flow. In the 9th forward gear (torsion gear), the eighth, seventh, and sixth wheel plane, RE-8, RE-7, RE-6, are engaged. When the 10th forward gear (torsion gear) is selected, the first, second, and fourth wheel plane, RE-1, RE-2, and RE-4, are engaged.

In order to provide the respective torsion forward gear 1, 2, and 9, as well as 10, the three wheel planes to be engaged are either completely allocated to the first sub-transmission A or completely allocated to the second sub-transmission B. This means that when a torsion forward gear is engaged, only the sub-transmission having the three torsion wheel planes is integrated into the torque flow of the selected gear, while the other sub-transmission is completely disconnected from the torque flow.

In order to form a reverse gear R, a reverse gear shaft 50 is disposed in the transmission housing, not shown, of the dual-clutch transmission, bridging the two sub-transmissions A, B parallel to the axis with respect to the input shafts 22, 23 and the output shaft 24. The reverse gear shaft 50 supports two gear wheels 51, 53, of which the first reverse gear wheel 51 engages the drive-side gear wheel 30 of the second wheel plane RE-2 and the second reverse gear wheel 53 engages the drive-side gear wheel 37 of the fifth wheel plane RE-5.

The first reverse gear wheel 51, which interacts with the second wheel plane RE-2 of sub-transmission A, is implemented as a detached gear wheel and can be detachably coupled to the reverse gear shaft 50 by means of a shift element SE-H engageable on one side. The reverse gear wheel 53 interacting with the fifth wheel plane RE-5, on the other hand, is implemented as a fixed gear wheel.

The reverse gear R is activated in that the shift element SE-C, which is supported by the first input shaft 22 in FIG. 1, is engaged to the left on the drive-side gear wheel 30 of the first wheel plane RE-1. In addition, shift element SE-H is engaged to the left on the first reverse gear wheel 51, and the output-side gear wheel 38 of the intermediate wheel plane RE-5 is linked to output shaft 24 via shift element SE-G. The reverse gear R is thus a torsion gear, in which, when the separating clutch K2 is engaged, the torque flow proceeds over the hollow input shaft 22 and the drive-side gear wheel 30 of the second wheel plane RE-2 onto the first reverse gear wheel 51 and further over the reverse gear shaft 50 and onto the second reverse gear wheel 53 to the output-side gear wheel 38 of the intermediate wheel plane RE-5.

The invention claimed is:

1. A dual-clutch transmission for a motor vehicle, comprising:
with gear wheel sets engageable via first to seventh shift elements, with the gear wheel sets forming precisely eight first to eighth wheel planes in series in the axial direction from the input side to the output side of the dual-clutch transmission, each wheel plane being allocated to a first sub-transmission and to a second sub-transmission, of which the first sub-transmission has an input shaft and the second sub-transmission has a second input shaft and both sub-transmissions have a common output shaft, wherein the input shafts, which are coaxial with respect to one another, can each be activated in an alternating manner via a power-shift clutch, and the even forward gears are allocated to the first sub-transmission and the odd forward gears are allocated to the second sub-transmission, which can be engaged upon a gear shift by way of the first to seventh shift elements, wherein each wheel plane provides a direct gear as a forward gear, with which, when the first or second sub-transmission is activated, precisely one wheel plane is engaged in the torque flow extending through the activated first or second sub-transmission, and wherein the wheel planes additionally provide at least one torsion gear as a forward gear, in which precisely three wheel planes, which are combined in series, are engaged in the torque flow by the first to seventh shift elements, wherein a total of four torsion forward gears, with a total of eight wheel planes, can be provided, and in that three wheel planes engaged for each torsion gear are allocated either completely to the first sub-transmission or completely to the second sub-transmission, so that, with each engaged torsion forward gear, only the sub-transmission having three wheel planes engaged for the respective torsion gear is integrated into the torque flow, and the other sub-transmission is completely de-coupled from the torque flow.

2. The dual-clutch transmission according to claim 1, wherein precisely five shift elements, engageable on both sides in the axial direction, are provided for engaging the forward gears, and two shift elements are provided, which can be engaged on one side in the axial direction.

3. The dual-clutch transmission according to claim 2, wherein, of the five shift elements, which can be engaged on both sides, precisely four shift elements are arranged coaxially with respect to the input axis of the first and second input shafts, and precisely one shift element, which can be engaged on both sides, is arranged on the output shaft.

4. The dual-clutch transmission according to claim 1, wherein at least two of the shift elements can be actuated in order to engage all of the forward gears.

5. The dual-clutch transmission according to claim 1, wherein the first and second input shafts of the eight wheel planes are free of torsion-resistant gear wheels arranged thereupon, and in that the first input shaft has precisely one first shift element, which can be engaged on both sides in the axial direction, and the second input shaft has precisely one second shift element, which can be engaged on both sides in the axial direction, and in that the first input shaft can be linked to the first to fourth wheel planes of the first sub-transmission, or can be de-coupled therefrom, by means of the first shift element, and in that the second input shaft can be linked to the fifth to eighth wheel planes of the second sub-transmission, or can be de-coupled therefrom, by means of the second shift element.

6. The dual-clutch transmission according to claim 5, wherein a drive-side detached gear wheel of a first wheel plane, mounted on the first input shaft, and a drive-side hollow shaft of the first sub-transmission, coaxially mounted on the first input shaft is arranged on both sides of the first shift element in the axial direction, which can be coupled in an alternating manner to the first input shaft via the first shift element, and the drive-side hollow shaft of the first sub-transmission supports a fixed gear wheel of the second wheel plane and a fixed gear wheel of the third wheel plane.

7. The dual-clutch transmission according to claim 6, wherein a drive-side gear wheel of the fourth wheel plane is detachably mounted on the drive-side hollow shaft of the first sub-transmission, and the drive-side hollow shaft of the first sub-transmission can be linked to the detachably mounted drive-side gear wheel of the fourth wheel plane by way of a third shift element.

8. The dual-clutch transmission according to claim 7, wherein the fifth wheel plane, directly adjacent to the first sub-transmission in the axial direction, is allocated to the second sub-transmission, and in that the fifth wheel plane can be linked to the first sub-transmission by the third shift element.

9. The dual-clutch transmission according to claim 8, wherein the fifth wheel plane, which can be engaged on both sub-transmissions, is detachably mounted with its drive-side gear wheel on the second input shaft, and the drive-side gear wheel of the fifth wheel plane can be linked to the drive-side hollow shaft of the first sub-transmission by means of the third shift element.

10. The dual-clutch transmission according to one of claim 5, wherein a drive-side detached gear wheel of the eighth wheel plane which is mounted on the second input shaft, and a drive-side hollow shaft, which is coaxially mounted on the second input shaft is arranged on both sides of the second shift element of the second sub-transmission in the axial direction, and the detached gear wheel of the eighth wheel plane and the drive-side hollow shaft of the second sub-transmission can be linked, in an alternating manner, to the second input shaft via the second shift element, and the drive-side hollow shaft of the second sub-transmission supports at least one fixed gear wheel of the seventh wheel plane.

11. The dual-clutch transmission according to claim 10, wherein a drive-side gear wheel of the sixth wheel plane is detachably mounted on the drive-side hollow shaft of the second sub-transmission, and the drive-side hollow shaft of the second sub-transmission has a fourth shift element, with which the detachably mounted drive-side gear wheel of the sixth wheel plane can be linked to the drive-side hollow shaft of the second sub-transmission.

12. The dual-clutch transmission according to claim 11, wherein the drive-side gear wheel of the fifth wheel plane engageable on both sub-transmissions can be linked to the second sub-transmission by the fourth shift element.

13. The dual-clutch transmission according to claim 1, wherein the output-side gear wheels of the first and second wheel planes of the first sub-transmission are arranged, in a torsionally resistant manner, on an output-side hollow shaft of the first sub-transmission, which is rotatably mounted coaxially on the output shaft.

14. The dual-clutch transmission according to claim 13, wherein the output shaft has a fifth shift element, by means of which the output-side hollow shaft of the first sub-transmission or an output-side gear wheel of the third wheel plane can be linked in an alternating manner to the output shaft in the first sub-transmission.

15. The dual-clutch transmission according to claim 1, wherein the output-side gear wheels of the seventh and eighth wheel planes of the second sub-transmission are arranged, in a torsionally resistant manner, on an output-side hollow shaft of the second sub-transmission, which is rotatably mounted coaxially on the output shaft.

16. The dual-clutch transmission according to claim 15, wherein the output shaft has a sixth shift element, by means of which the output-side hollow shaft of the second sub-transmission can be linked to the output shaft.

17. The dual-clutch transmission according to claim 9, wherein the output-side gear wheel of the fifth wheel plane, which can be engaged on both sub-transmissions, is detachably mounted on the output shaft and can be linked to the output shaft by way of a seventh shift element.

\* \* \* \* \*